United States Patent [19]
Wiegardt, Jr.

[11] 3,766,888
[45] Oct. 23, 1973

[54] SYSTEM FOR GROWING CONCENTRATED POPULATIONS OF OYSTERS AND RELATED SHELLFISH

[76] Inventor: John L. Wiegardt, Jr., Box 16, Nahcotta, Wash.

[22] Filed: Nov. 8, 1971

[21] Appl. No.: 196,684

[52] U.S. Cl. .................................................. 119/4
[51] Int. Cl. ............................................ A01k 61/00
[58] Field of Search ................................ 119/2, 4, 3

[56] References Cited
UNITED STATES PATENTS

| | | | |
|---|---|---|---|
| 3,650,244 | 3/1972 | Fordham | 119/4 |
| 249,942 | 11/1881 | Hughes | 119/4 |
| 1,660,259 | 2/1928 | Elsworth | 119/4 |
| 463,397 | 11/1891 | Walton, Sr. | 119/4 |
| 3,517,648 | 6/1970 | Budge | 119/4 |

FOREIGN PATENTS OR APPLICATIONS

| | | | |
|---|---|---|---|
| 79,595 | 11/1962 | France | 119/2 |
| 69,116 | 6/1950 | Norway | 119/4 |

Primary Examiner—Russell R. Kinsey
Assistant Examiner—James H. Czerwonky
Attorney—Richard W. Seed et al.

[57] ABSTRACT

Systems are described for the forced feeding of mollusks such as free oyster and clam seed employing rafts or a flume, having means holding the free oyster or clam seed. Water containing nutrients is forced upwardly through the free oyster or clam seed to feed a dense population thereof by tide flow in a system operating below water level. The rafts are anchored to take advantage of the tide flow. Baffles graduated in length from the forward end to the rear are provided at spaced intervals, transverse to the direction of the incoming tide flow. These baffles extend downwardly at a forward inclined angle. The system includes trays having foraminous bottom walls in which the free oyster or clam seed rests. The upward flow of water through the oyster and/or clam population also continuously removes detritus generated.

5 Claims, 9 Drawing Figures

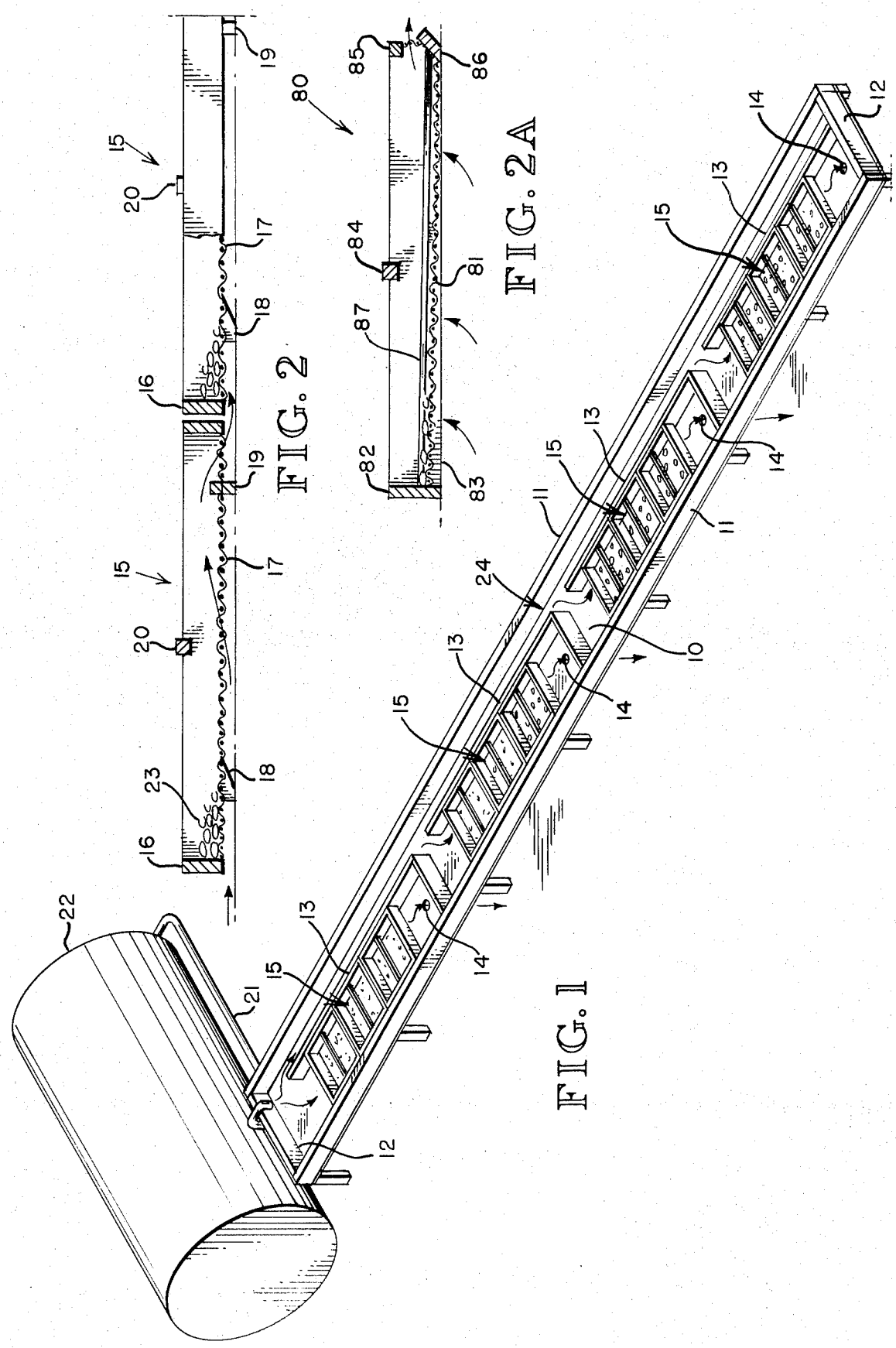

3,766,888

SYSTEM FOR GROWING CONCENTRATED POPULATIONS OF OYSTERS AND RELATED SHELLFISH

BACKGROUND OF THE INVENTION

1. Field of the Invention

This invention relates to a system for the artificial growing of mollusks such as free oyster and clam seed, either in rafts anchored in tidal flow areas or in a flume system.

2. Prior Art Relating to the Disclosure

Oysters, in their natural state, reproduce by spawning free swimming larvae that diffuse into the water medium. After a time for development, usually several weeks in duration, the larvae attach to suitable materials, usually clean, hard objects such as rocks and oyster shells. The natural home of the oyster is thus usually an oyster reef where oysters continually attach themselves to the shells of their predecessors, or a rocky beach or ledge. In these areas, the same currents that carry the oyster larvae carry the plankton to the attached oyster from which he derives his food.

The reproductive cycle of the oyster has been used to advantage by man by placing "cultch" materials — shells, rocks, sticks, etc. on which the oyster larvae attach, and then cultivating the resulting seed. One of the earliest methods of this type cultivation was to plant the cultch with seed attached on suitable "bottom" areas of estuaries in populations dense enough to permit efficient care and harvesting. Using this type of culture seed must be both cheap and plentiful as losses in the growing population are high due to the actions of predators and silting. Further, the "bottom areas" are not the natural home for the oyster and feeding conditions are usually not as good as these in natural reefs and rocks where tide flows and currents are swifter. In the areas where oysters reproduce naturally, however, the success of the setting often results in overcrowding in the oyster population, both in terms of space occupied and in competition for available food.

To overcome the problems generated by both "natural" and "bottom" culture and to ensure better seed survival and oyster growth, more advanced types of cultures, utilizing various means to suspend the oyster off the bottom have been developed. These include providing trays, sticks or shells with seed attached. When shells are used they are generally spaced out on wires or ropes.

Recent developments in hatchery techniques have made possible the production of adequate supplies of oyster and clam seed for commercial operation regardless of "natural" sets. One of the results of hatchery technology has been the development of "cultchless" or "free" oyster seed where oyster seed is produced that is not attached to "cultch." A method and apparatus for growing free oyster seed is described in U. S. Pat. No. 3,517,648, wherein water containing nutrients is pumped continuously through the seed population carrying food to and detritus from the seed.

The major problem with the use of free seed has been to take it through from the tiny hatchery-produced stage to a size and condition where it has commercial value. Present hatchery technology limits the size to which the seed can be grown feasibly because of the costs involved in the production of food for the seed.

SUMMARY OF THE INVENTION

This invention provides means of growing free oyster and clam seed in a system which provides, through the medium of an induced, upwelling flow of water, a supply of nutrients adequate to sustain maximum rates of growth and condition throughout a concentrated, dense population. In this system, smaller oysters and clams tend to sift to the lower areas of the population; however, since they have first access to the upwelling nutrient-laden flow of water, they obtain adequate supplies of food, thus assuring uniform rates of growth throughout the population. Since the upwelling flow of water partially supports the oyster, the oyster can grow and expand in relation to others held in similar suspension with no distortion of shape as results in a crowded "natural" or conventional tray system. Thus, population densities are feasible which have never before been possible using other culture systems and the natural tendency of oysters and clams to grow and produce edible meats can be better controlled and utilized.

Oysters and clams can be grown to any size with the system of this invention, with optimum sizes dependent upon balancing of the costs of constructing and operating the system against the costs of implanting the oysters in natural estuarial areas or other culture systems.

The upwelling current of water through the oyster or clam seed can be developed by a number of means, including gravity pumping or tidal flow, or using, if desired, by-product water of other systems such as cooling water from thermal or nuclear power plants. Oysters and clams can be used as filtering agents with the system of this invention to clean up algae and plankton populations in water passing through the system.

The objects of this invention include (1) providing a flume holding a series of trays having foraminous bottom walls on which the free oyster or clam seed rests, water being forced upwardly through the population in the trays; (2) providing a raft holding the free seed, the raft designed to be anchored in an area of tide flow wherein water containing nutrients is forced upwardly through the population contained in the trays to feed them and to carry away the detritus generated; (3) providing a raft for artifically growing oysters and clams, the raft including a series of graduated baffles extending downwardly from the bottom of the raft, the baffles directing the incoming tide flow upwardly through free seed contained in a series of abutting and stacked trays having foraminous bottom walls, each tray holding a dense free seed population; (4) providing a raft for artificially growing oysters and clams wherein water containing nutrients is drawn upwardly through a dense population held within an elongated duct; (5) providing a raft for artificially growing oysters and clams utilizing power means, such as an impeller, for drawing the nutrient-containing water through the population; and (6) providing a series of nesting trays positioned along the axis of tidal flow with a system of baffles that directs an upward flow of water through a portion of the population during each phase of the tidal flow.

BRIEF DESCRIPTION OF THE DRAWINGS

FIG. 1 is a perspective view of one means of artificially growing oyster and clam seed utilizing a flume having removable trays holding the seed, the trays positioned in the water flow down the flume and designed to force the water upwardly through the bottom of the trays through the dense oyster or clam population resting therein;

FIG. 2 is a partial longitudinal cross-sectional view through two of the abutting trays illustrating the water flow therethrough;

FIG. 2A is a longitudinal cross-sectional view illustrating an alternate tray design;

DESCRIPTION OF THE PREFERRED EMBODIMENTS

Figure 3:
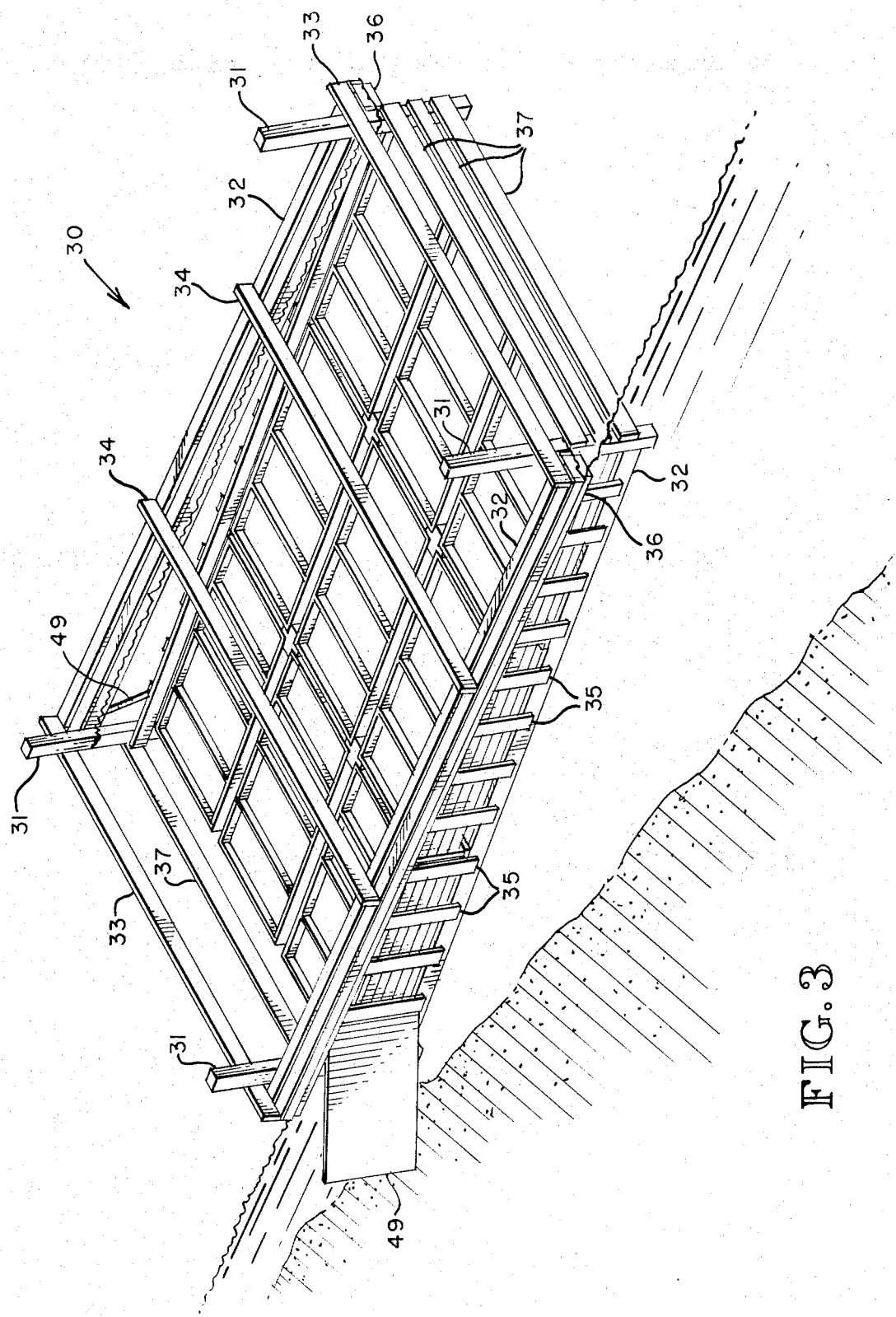
FIG. 3 is a perspective view of a raft anchored in a tide flow region with a series of trays positioned therein holding oyster or clam seed.

Referring to FIG. 1 a flume system is illustrated in which mollusks, either free oyster seed or clam seed, rests in a series of trays having foraminous bottom walls positioned in the path of water flow through the flume. The flume includes a bottom wall 10 sloping downwardly from the point of introduction of the water with upended sidewalls 11 and endwalls 12. The flume may be divided into sections at spaced intervals along the length thereof by separators 13. At the end of each of the sections is a drain 14. Within each of the sections are positioned a series of trays adjacent one another in which the oyster or clam seed rests.

FIG. 2 shows one tray design in more detail. Each of the trays 15 include vertical sidewalls 16 and a foraminous bottom wall 17. At the forward end of each of the trays are legs 18 which space the bottom wall of the tray from the bottom wall 10 of the flume. Near the rear of each tray is a baffle 19 extending the full width of the tray. Preferably the baffle is positioned just forward of the rear sidewall of the tray and has a height less than the height of the sidewalls of the tray. Each of the trays may be provided with a handle 20 if desired.

An alternate tray design is illustrated by FIG. 2A. Each tray 80 includes three upended sidewalls 82 connected to a foraminous bottom wall 81. The rear sidewall 85 is also foraminous. Parallel legs 83 extend down the length of the sidewalls of the tray. The legs 83 preferably slope downwardly beginning at the front of the tray from about ½ inch to 1 inch giving a reverse slope to the bottom wall 81, thereby allowing water to flow evenly to the oyster or clam population resting on the upper surface of the bottom wall 81. The trays may be provided with a handle 84 for removal and insertion of the tray in the flume. The lower portion 86 of the rear wall of the tray forms a support for the tray, extends the full width of the tray and is designed to act as a "water-stop" to force water upwardly through the bottom wall of the tray. Preferably the rear wall portion 86 is sloped rearwardly at an angle approximating 45° to provide smooth flow of water through the tray. Longitudinally extending supports 87 secured to the bottom wall 81 and the front and rear side walls may be provided to aid in supporting the foraminous bottom wall 81. These supports should have sloped upper surfaces to prevent seed from resting on them.

When the trays are positioned in the path of waterflow down the flume as illustrated in FIG. 1, water entering through conduit 21 from water supply 22, the water supply containing nutrients for the seed, is directed into each of the sections where it flows beneath the first of the trays positioned therein until baffle 19 or rear wall 86 is encountered. Referring to FIG. 2 the baffle forces the water upwardly through the screen bottom wall of the tray over the top of baffle 19, down through the bottom wall to the rear of the baffle and to the next abutting tray.

With the tray design of FIG. 2A the trays must be spaced from each other a few inches to allow water exiting through the rear wall of one tray to turn below the next adjacent tray. Oyster or clam seed 23 resting in a dense population limited only by the height of trays and flume in each of the trays is thus provided with a continuous supply of nutrient-containing water. The water aids in carrying away the detritus generated by the seed. The number of trays which can be positioned in sequence in each of the sectioned areas is dependent on the population of seed in each of the trays, the rate of flow of the water through the trays, the size of the trays and other variables. Rather than as shown, a separate water supply can be provided to the forward end of each of the sectioned areas containing trays instead of channeling the water down a side channel 24 as illustrated in FIG. 1, the water diverted to the forward end of each of the series of trays.

The water after passing over and through the series of trays containing the free oyster seed drains through opening 14 in the bottom wall of the flume. The water supply may be taken from any appropriate source containing proper nutrients for the oyster seed.

Oyster seed grown in the trays as described grow uniformly throughout the length and height of each tray. The upward flow of water containing nutrients through the dense population of oyster seed supplies nutrients to all the oysters in the trays uniformly and permits optimum growth of the population.

The flume system illustrated in FIG. 1 may be stacked one above the other in a relatively small area to enable artificial growing of great numbers of oyster or clam seed to an intermediate size. The flume system is housed within a suitable enclosure to prevent direct sunlight on the oyster beds.

Figure 4:
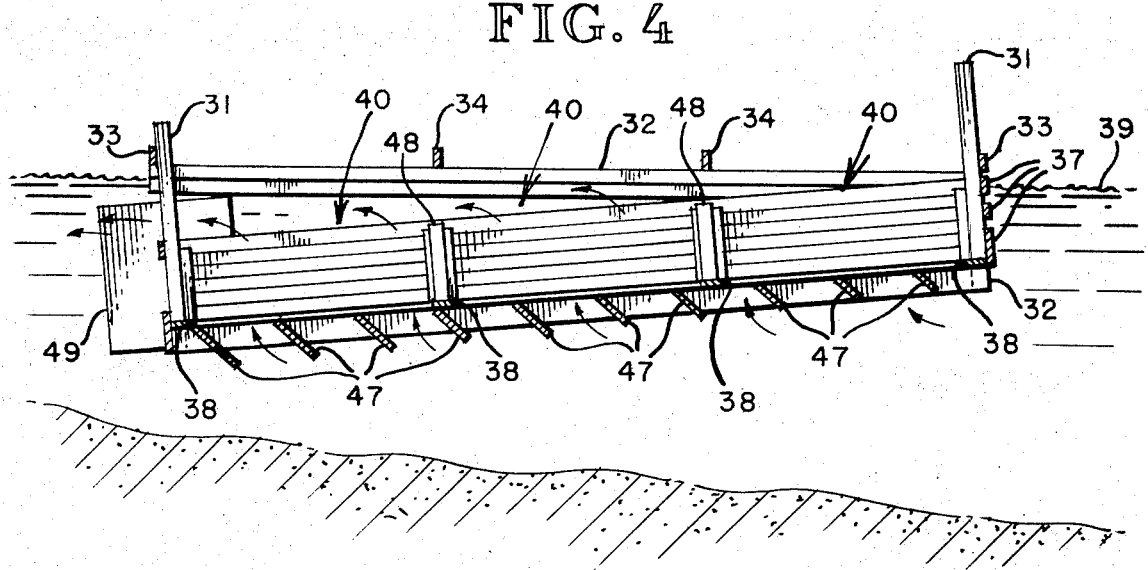
FIG. 4 is a longitudinal cross-sectional view of the raft of FIG. 3 illustrating water flow through the raft.

FIG. 3 shows a raft system for artificially growing oysters or clams, the raft adapted to be anchored to a single anchor on which it can pivot in an area of relatively fast tide flow. The ebb and flow of the tide is utilized to force feed the seed contained in foraminous bottom walled trays in the raft. The raft 30 includes a frame comprising vertical corner supports 31 joined together by longitudinally extending upper and lower beams 32, and transverse beams 33. Cross beams 34 are utilized to stabilize the frame structure. Side slats 35 are used to prevent substantial water flow through the side walls of the raft. Under each of the upper beams 32 or at other suitable locations are provided floats 36 of expanded polystyrene or other suitable flotation material. At the forward end of the raft are disposed deflectors 37 extending across the width of the forward end. The deflectors aid in preventing water flow over the top of the trays resting in the raft. Instead the water is directed under the raft and then upwardly through the trays. Reference is made to FIG. 4 showing that the horizontal plane formed by the lower beams 32 and tray supports 38, is sloped downwardly from the forward end of the raft in order to achieve uniform water flow upwardly through trays positioned in the raft as will be described.

Figure 5:
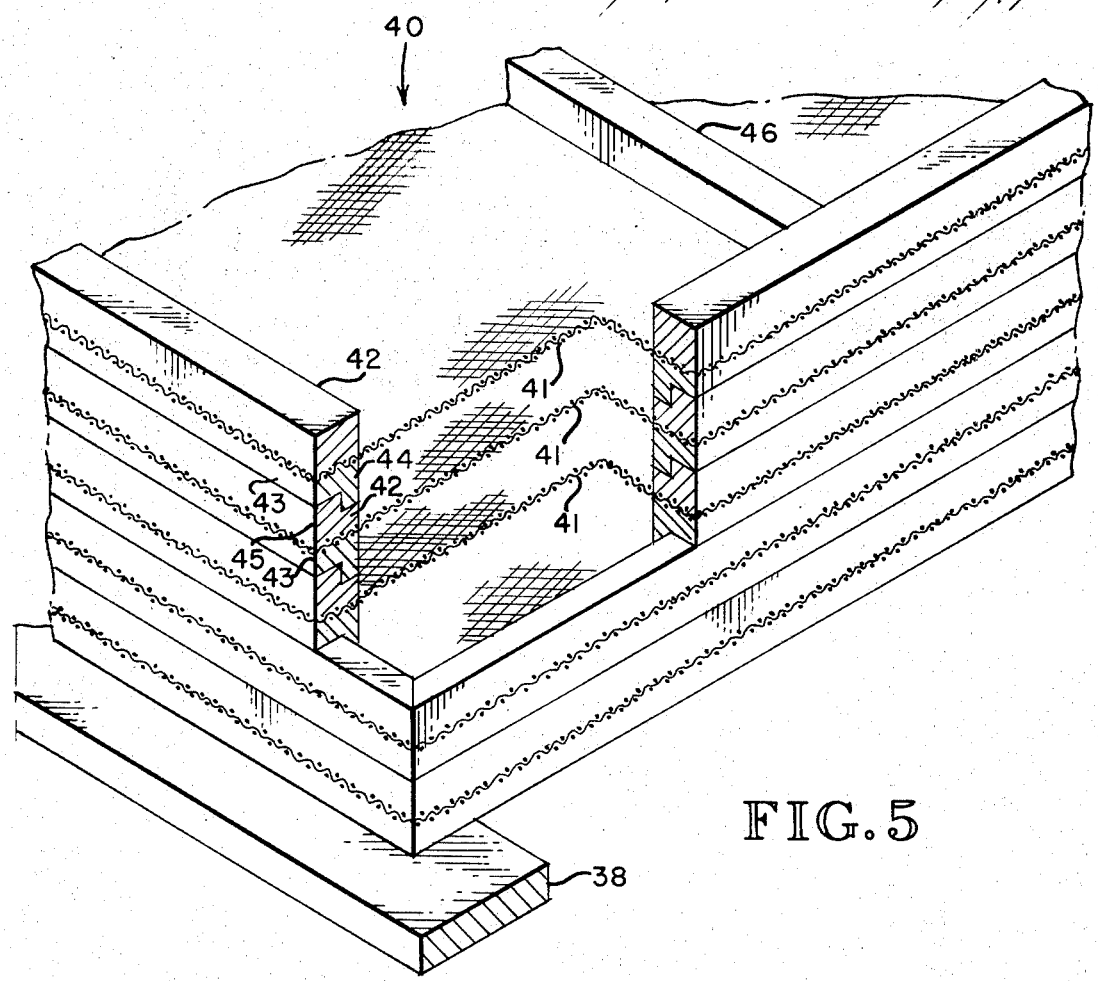
FIG. 5 is a partial perspective view of a series of nested trays, each holding a dense population of seed, the trays adapted for positioning in the raft of FIG. 3.

Stacks of trays, preferably nested together as illustrated in FIG. 5, are rested on the spaced tray supports 38 as shown in FIG. 4. FIG. 5 shows the trays 40 in more detail. Each of the trays has a foraminous bottom wall 41 sandwiched between upper and lower side walls 42 and 43. Referring to FIG. 5 the lower sidewall 43 may have a flange 44 extending downwardly therefrom which keys together with an upwardly extending flange 45 of the upper sidewall 42 of the next adjacent tray, enabling the trays to be nested together. The trays may be banded together with ordinary strapping equipment to insure retention of seed. A cover (not shown) covers the top tray to prevent direct sunlight on the oysters resting on the upper surface of each of the trays.

The trays are held in the raft by any suitable means such as metal straps extending across the top of the trays bolted to the sides of the raft frames and to spaced vertical supports 48 extending from the tray supports 38 at the intersecting corners of each of the trays. The trays may be provided with center supports 46 as necessary.

Referring to FIG. 4 baffles 47 graduated in length from the forward end to the rear are provided at spaced intervals, transverse to the direction of incoming tide flow. These baffles extend downwardly at a forward inclined angle as illustrated to direct the incoming tide flow upwardly through the seed resting in the trays. The combination of the sloping bottom wall of the raft and the graduated length baffles enables a maximum amount of water to be deflected uniformly through the entire series of trays held in the raft.

At the rear of the raft deflector plates 49 may be provided, the deflector plates extending outwardly from the sidewalls of the raft at an angle thereto. The deflector plates deflect water flow alongside the raft outwardly and thereby create a partial negative pressure at the open rear end of the raft aiding the water flow upwardly through the oysters or clams in the trays and out the rear end of the raft. The deflector plates also help to position the raft directly in the tide flow. FIG. 4 shows the water flow pattern through the raft and trays positioned therein. The raft is provided with a top cover to shield the oysters in the upper trays from direct sunlight and to prevent fouling growth. The upper tray at the forward end of the raft should be positioned below the water level 39 at all times. The number of trays which can be stacked in each series is dependent on the amount of water flow through the raft, the depth of the seed in each tray and other factors.

Utilizing the raft as described, oysters can be grown uniformly throughout the trays at optimum rates and in greater densities than heretofore possible. The raft is anchored transversely to the tide flow by suitable anchor means.

The size and dimensions of the raft may be varied as desired. As illustrated each of the trays in the raft of FIG. 3 is approximately 4 feet wide and 7 feet long with the total length of the raft being approximately 21 to 23 feet long and about 13 to 14 feet wide. Each of the trays is about 6 inches deep and is filled with oyster or clam seed.

Figure 6:
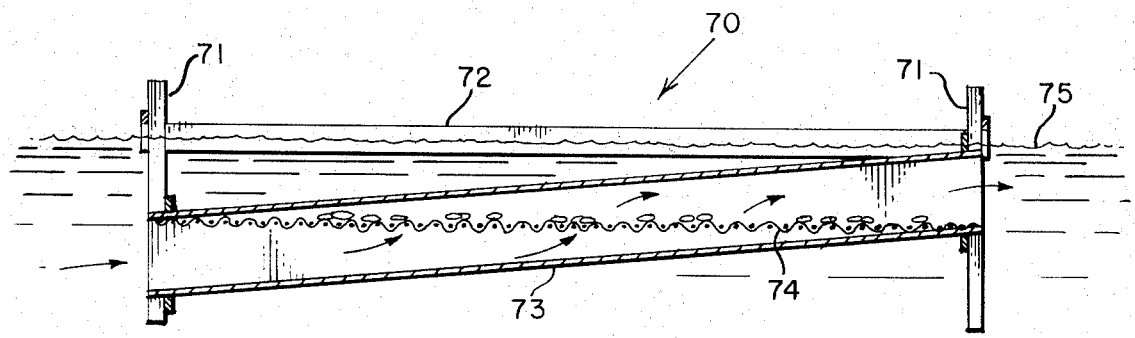
FIG. 6 is a longitudinal cross-sectional view of a raft employing an inclined elongated duct within which the oyster or clam population is held.

FIG. 6 illustrates a raft design, the raft 70 also adapted to be anchored to a single anchor about which it can pivot in areas of tide flow. The raft 70 comprises vertical corner supports 71 joined together by beams 72, both longitudinal and transverse. An elongated open ended duct or tube 73 is supported by the raft frame, the duct inclined upwardly from the front of the raft to the rear thereof (relative to the direction of water flow). The duct is completely enclosed. In the interior thereof is a mesh bottom wall 74 extending essentially horizontally relative to the water line 75. The mesh 74 is designed to support an oyster or clam population on its upper surface. Water containing nutrients is drawn through the duct 73 and the population contained therein. Assuming the duct has dimension of about 2 feet in depth and 4 feet in width with a waterflow therethrough at about 1 mph, approximately 300,000 gallons of water will flow through the duct in about one hour. Floats (not shown) of expanded polystyrene foam or other suitable material are provided as illustrated by FIGS. 3 and 4 to support and stabilize the raft in the water. This tray design affords several advantages over that illustrated by FIGS. 3 and 4 in that the top of the duct acts as the cover and the duct automatically loads with water as the waves become higher. Oyster or clam seed is loaded and unloaded from the raft by pumps which are commercially available.

Figure 7:
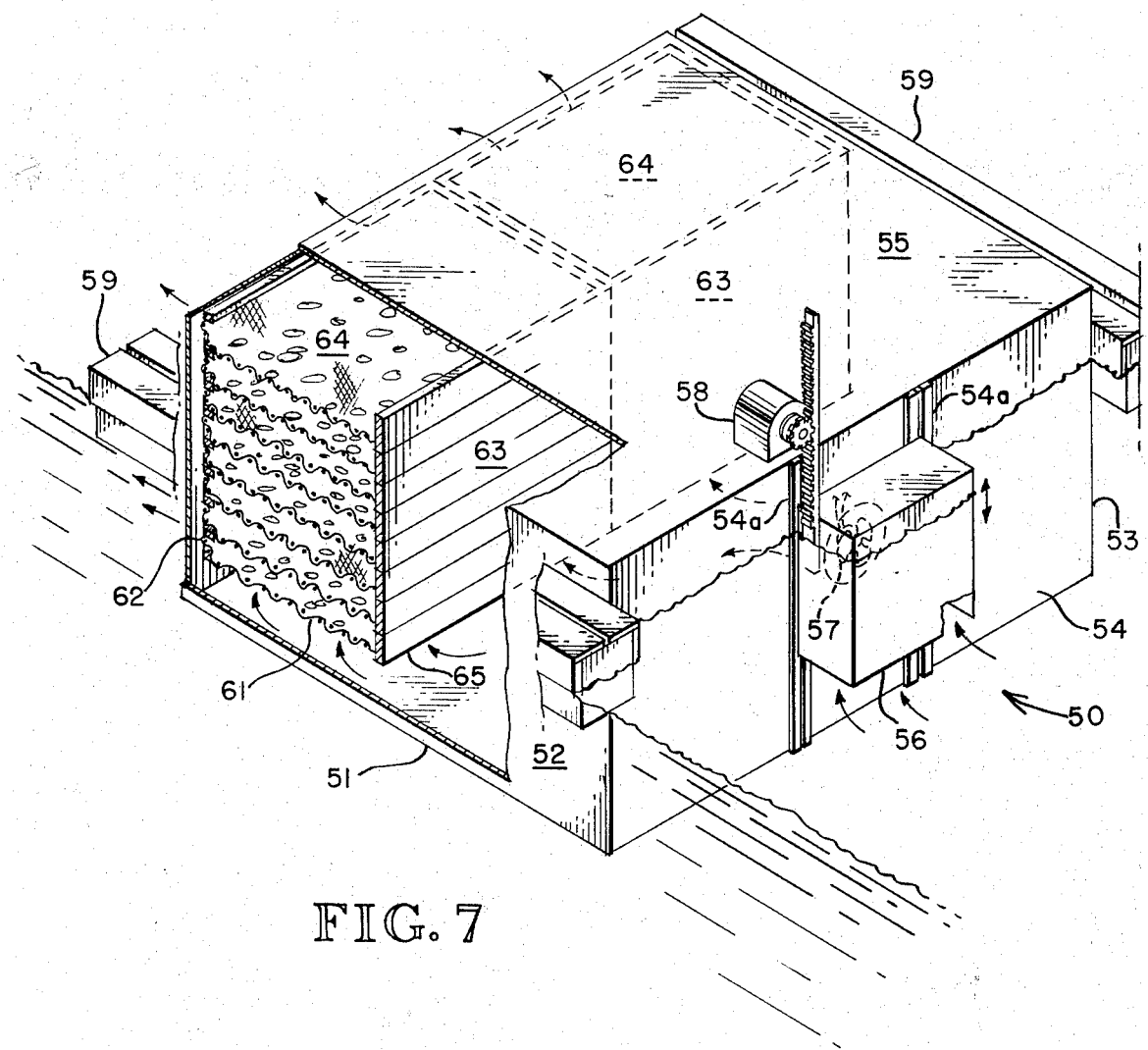
FIG. 7 is a perspective view of a raft system utilizing an impeller to force nutrient-containing water through a series of trays.

FIG. 7 illustrates a further alternate to the flume system of FIG. 1. This system utilizes an impeller or other suitable power means to force nutrient-containing water through trays holding oyster or clam populations, the trays held in a floating container 50. The container 50 includes a bottom wall 51, vertical sidewalls 52, 53, a front wall 54 and top wall 55. The rear wall is a mesh material which allows free flow of water therethrough.

The forward wall 54 is provided with an opening therein. Mounted on each side of the outer side of the opening are guides 54a. A box-like hood 56 is provided with a power driven impeller 57 mounted in the end wall thereof adjacent the front wall 54, the hood adapted to slide vertically along the rails 54a. The bottom wall of the hood is open to receive water. Suitable power means (not shown) are used to drive the impeller which draws water into the interior of the container 50. A suitable mechanical or power system 58 is utilized to raise or lower the hood and impeller to determine the level at which water is drawn into the impeller. Flotation means 59 such as expanded polystyrene are secured to the side walls of the container. A series of nesting trays 63 having foraminous bottom walls 64 and rear walls 62 are positioned in the container. The lowermost wall 65 of the series of the trays is supported from the bottom wall 51 of the container to allow adequate water flow upwardly through the trays. The unit as shown in FIG. 7 is about 7 feet long, 8 feet wide and 4 feet deep. The trays, removable at the rear of the container, are about 3 feet wide and 4 feet in length. Nutrient containing water is driven through the trays holding oyster or clam seed by the impeller.

Figure 8:
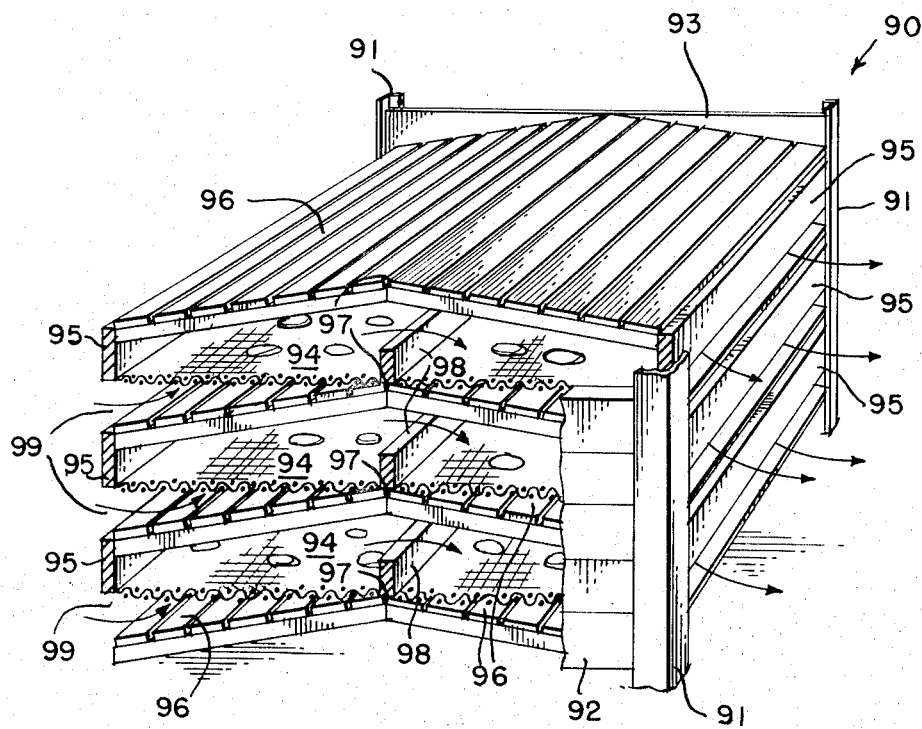
FIG. 8 is a perspective view of a modified raft design.

FIG. 8 illustrates another raft configuration adapted to be anchored to fore and aft anchors to position it along the axis of the tidal flow. The raft frame 90 comprises vertical corner supports 91 joined by solid side walls 92 and 93 and upper and lower beams (not shown) joining the side walls together. A series of trays are stacked within the frame of the raft. Each tray has a foraminous bottom wall 94 joined to vertical side walls 95. A solid top 96 covers each of the trays and is inclined upwardly from the front and rear of the tray to form a center apex 97. A median support 98 extends between the side walls of the tray. When the trays are stacked in the raft frame the median support of each upper tray rests on the apex of the tray just beneath. The corners of the trays are supported by the corner supports 91. When positioned in an area of tide flow, nutrient-containing water entering through openings 99 between each tray is first deflected upwardly through a forward portion of the bottom wall of the tray on which the free oysters or clams rest and then down through the oyster or clam population in the rear portion of the bottom wall of each tray as illustrated by the arrows in FIG. 8. Flotation means (not shown) are secured to the frame to maintain the raft at the proper level.

Generally it has been found that oyster seed obtained directly from a hatchery operation (generally about 1/10 inch in diameter) can be grown to any size desired, with the timing of its removal from the flume system depending upon the availability of space in the raft system and upon the degree to which space in the flume is taken up by the growing population. For example, under optimum temperature and nutrient conditions, the population of oysters doubles its space requirements every wwek, increasing in displacement volume by about 60 percent. As the seed grows from the sizes produced in the hatchery operation it is removed from the trays and screened to size then kept separated when replaced into trays. Seed can be removed from the flume at ¼ inch, ⅝ inch, ½ inch, diameter or larger sizes. The raft systems described can be used to grow the seed to harvestable size, or to intermediate sizes from which it can be transferred to other systems.

The embodiments of the invention in which a particular property or privilege is claimed are defined as follows:

1. A floating raft utilizing the tide flow to furnish water containing nutrients to a dense population of free oyster or clam seed held in a plurality of trays within the raft comprising:

a frame structure adapted to be positioned transversely to the tide flow having an open rear end, a substantially closed front end, and bottom wall supports forming a plane sloping downwardly from the forward end of the raft towards the rear end thereof relative to the water line, flotation means secured to the frame structure for maintaining the upper portion of the raft at essentially water level, retaining means for trays to be positioned in the raft, a series of trays holding free oyster seed resting on the bottom wall supports of the raft, each tray including a frame defining sidewalls and a foraminous bottom wall on the upper surface of which free oyster or clam seed rest, baffles extending downwardly from the plane formed by the bottom wall supports of the raft at spaced intervals and transverse to the tide flow, the depth of the baffles increasing from the forward end of the raft to the rear, for directing the tide flow containing nutrients upwardly through the bottom walls of the trays, providing nutrients to the seed and removing detrius therefrom; the water, after flowing through the seed, exiting through the open rear end of the raft.

2. The raft of claim 1 wherein the trays are stacked and nested together.

3. The raft of claim 1 including water deflectors extending transversely across the front end and down the side walls of the raft preventing substantial water flow into the raft over the top of the trays positioned therein.

4. The raft of claim 1 including a removable top cover for the raft.

5. The raft of claim 1 including vertical water deflectors extending outwardly from the sidewalls of the raft near the rear end thereof to deflect water flow along the sides of the raft outwardly and create a partial negative water pressure between the sidewalls at the rear end of the raft aiding water flow upwardly through the trays and out the rear end thereof, and aiding in positioning the raft in the tidal flow.

* * * * *